UNITED STATES PATENT OFFICE.

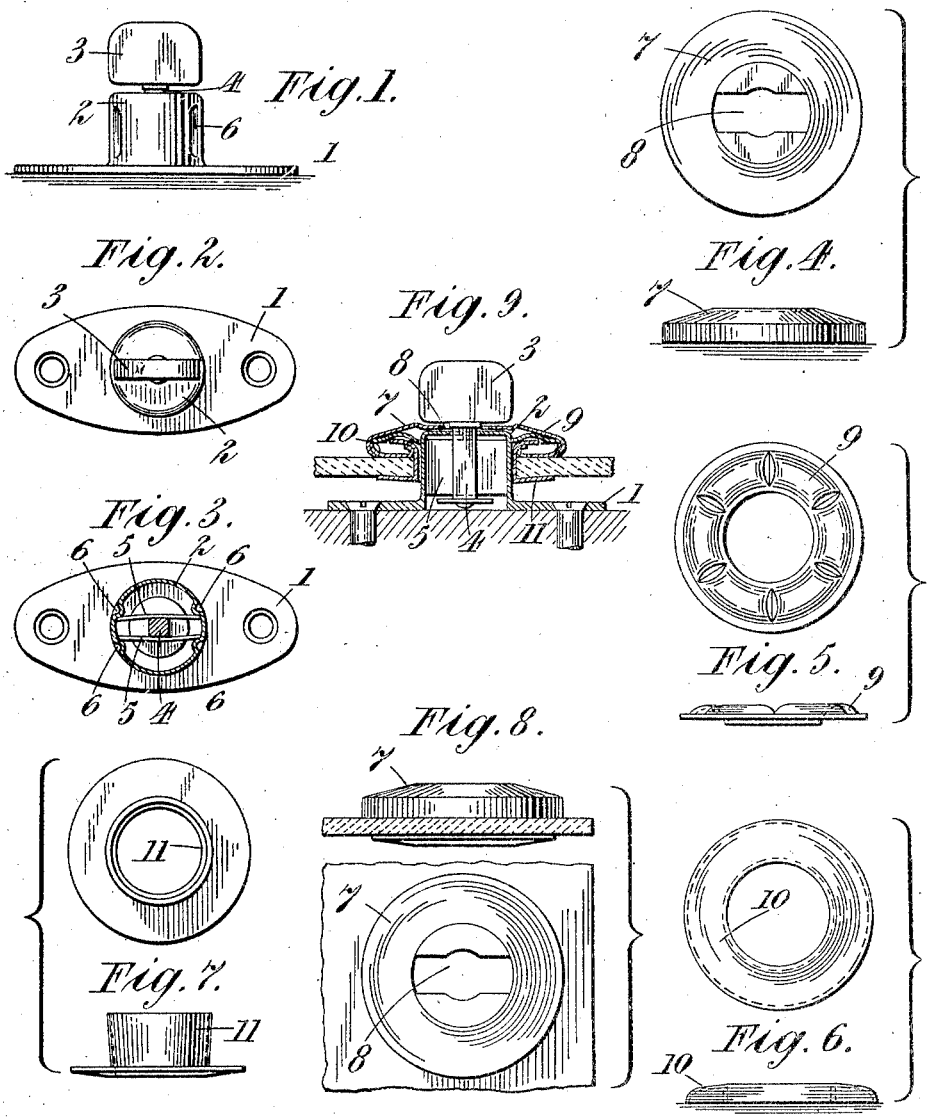

FRANÇOIS CHARLES DULAC, JULES CÉSAR VAGNOT, AND ADOLPHE BESSIRON, OF PONT-DE-CLAIX, ISÈRE, FRANCE.

FASTENER FOR MOTOR-CAR HOODS AND THE LIKE.

1,334,845. Specification of Letters Patent. Patented Mar. 23, 1920.

Application filed January 15, 1915. Serial No. 2,490.

*To all whom it may concern:*

Be it known that we, FRANÇOIS CHARLES DULAC, JULES CÉSAR VAGNOT, and ADOLPHE BESSIRON, all citizens of the French Republic, and residing at Pont-de-Claix, Isère, France, have invented certain new and useful Improvements in Fasteners for Motor-Car Hoods and the like, of which the following is a specification.

This invention relates to improvements in turnbutton fasteners for tarpaulins, canvas or hoods of cars, etc., as well as in the method of securing or connecting the said fastener to the said tarpaulins, hoods, canvas etc., and has for its main object to render more reliable the fixing of the socket receiving the stud of the button, by replacing the oval socket hitherto used by a strongly clamped round socket engaging a cylindrical stud.

A construction according to this invention is illustrated in the accompanying drawing in which—

Figure 1 is an elevation of the button;

Fig. 2 a plan;

Fig. 3 an under-plan showing the method of fixing the springs;

Fig. 4 a plan and elevation of the face of the attachment button;

Fig. 5 a similar view of the inner part facilitating the riveting;

Fig. 6 a view of the bottom support, and

Fig. 7 a view of the eyelet used for fixing and connecting the cap.

These parts are assembled in the order indicated by the figures and set together so as to form a socket member clamped to the material or fabric as shown in Fig. 8 in elevation and in plan. Fig. 9 shows in section a complete fastener mounted in place.

The button comprises a solid base 1 provided with two holes for the passage of the fixing screws, or the base can be of any shape, provided with claws or screws for fixing it. With the base a hollow cylindrical part or stud 2 is cast or stamped out to receive springs 5 and the shank 4 of a key 3. The key has a flat head of width equal to the diameter of the stud, and its shank turns between the two springs 5 inside the stud. These springs are held in position by means of four indents 6 formed in the wall of the stud by stamping or in some other manner. The key thus has two working positions, in one of which the fastener is closed, and in the other open, while at the same time the key is strongly held by the springs.

7 is the body member of the socket, intended to receive the key, and is provided with a slot 8 of rectangular or any other shape for the passage of the key.

9 and 10 are the remaining parts of the socket, 9 being a guide member for the stud and 10 the base member of the socket. 11 is an eyelet for securing and connecting the cap to the canvas, tarpaulin or hood.

The working of this fastener is similar to that of other well-known fasteners, and need not be described.

The socket described above gives a much better fixing of the closing device. While the old oval eyelets, secured simply by turning over the cut out portions of one part, had no solidity and were soon pulled out, the method of fixing the clamped socket forming one piece with the canvas or tarpaulin, gives very great strength and consequently a very long life.

The fastener can be fixed in any position, and consequently the socket will be fixed in the desired position for bringing about the closing.

The cylindrical shape of the stud of the fastener gives a much better button, a better support to the eyelet shown in Fig. 7, and to the guide member shown in Fig. 5, which thus rest on the whole of their circumference, and consequently a better fixing of the tarpaulin or hood which better resists pulling. Moreover, the cylindrical shape of the stud of the fastener makes it possible to use round eyelets for intermediate curtains, which is a very important advantage from the point of view of economy and facility of fixing.

Lastly, the above described construction of the socket member lends itself readily to the application thereto of a decorative shell incasing the body member, said shell being preferably of the same color as the fabric, leather, or the like to which the socket member is attached, and made of celluloid or other convenient material.

What we claim as our invention and desire to secure as Letters Patent is:—

1. A turnbutton fastener for tarpaulins, hoods for cars, and the like, comprising, a base member having a hollow cylindrical stud thereon, springs held within the stud, a key having a flat head of width equal to the diameter of the stud and a shank coöperating with the springs to hold the key resiliently in either of two positions, a round socket member adapted to fit on the stud and having a transverse slot in its outer web to receive the flat head of the key, and an eyelet for securing the socket member to the fabric supporting same.

2. A turnbutton fastener for tarpaulins, hoods for cars, and the like, comprising, a base member having a hollow cylindrical stud thereon, springs held within the stud, a key having a flat head of width equal to the diameter of the stud and a shank coöperating with the springs to hold the key resiliently in either of two positions, a round socket member adapted to fit on the stud and having a transverse slot in its outer web to receive the flat head of the key, said socket member being built up of a body member formed with the slot, a base member, a guide member for the stud and an eyelet between which and the base member the supporting fabric is clamped.

3. A turnbutton fastener for tarpaulins, hoods for cars, and the like, comprising, a base member having a hollow cylindrical stud thereon, springs held within the stud by means of indents in the wall of the latter, a key having a flat head of width equal to the diameter of the stud and a shank coöperating with the springs to hold the key resiliently in either of two positions, the key being held in the socket in such a position as to leave a gap between the bottom of the head and the top of the stud, and a round socket member adapted to fit on the stud and having a transverse slot in its outer web to receive the flat head of the key, said socket member being built up of a body member formed with the slot, a base member, a guide member for the stud, and an eyelet between which and the base member the supporting fabric is clamped.

In testimony whereof we have signed our names to this specification in the presence of two subscribing witnesses.

FRANÇOIS CHARLES DULAC.
JULES CÉSAR VAGNOT.
ADOLPHE BESSIRON.

Witnesses:
LOUIS ESCHLE,
MARIUS MERMAR.